United States Patent
Swiderski

(10) Patent No.: US 9,840,258 B1
(45) Date of Patent: Dec. 12, 2017

(54) SYSTEM, METHOD, AND APPARATUS FOR DETECTING VEHICLE OPERATOR CONDUCT

(71) Applicant: Westinghouse Air Brake Technologies Corporation, Wilmerding, PA (US)

(72) Inventor: Frank J. Swiderski, Cedar Rapids, IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 15/176,897

(22) Filed: Jun. 8, 2016

(51) Int. Cl.
| | |
|---|---|
| *B60Q 1/00* | (2006.01) |
| *B60W 40/09* | (2012.01) |
| *B61L 23/00* | (2006.01) |
| *B61L 27/00* | (2006.01) |
| *G08B 25/10* | (2006.01) |

(52) U.S. Cl.
CPC ............ *B60W 40/09* (2013.01); *B61L 23/00* (2013.01); *B61L 27/0038* (2013.01); *B61L 27/0077* (2013.01); *G08B 25/10* (2013.01)

(58) Field of Classification Search
CPC ......... H04M 1/72563; H04M 1/72577; H04M 1/72569; B60W 40/09; G08B 25/10; B61L 23/00; B61L 27/0077; B61L 27/0038
USPC ............... 340/439; 180/272; 455/418; 701/1
See application file for complete search history.

(56) References Cited

U.S. PATENT DOCUMENTS

| | | | |
|---|---|---|---|
| 6,772,057 B2 | 8/2004 | Breed et al. | |
| 7,983,817 B2 | 7/2011 | Breed | |
| 8,948,442 B2 | 2/2015 | Breed et al. | |
| 8,994,492 B2 | 3/2015 | Farhan et al. | |
| 9,042,872 B1 * | 5/2015 | Breed | H04M 1/72577 455/414.1 |
| 9,137,498 B1 | 9/2015 | L'Heureux et al. | |
| 9,165,201 B2 | 10/2015 | Zhang et al. | |
| 2009/0029675 A1 * | 1/2009 | Steinmetz | H04K 3/415 455/410 |
| 2011/0237219 A1 | 9/2011 | Mendenhall et al. | |
| 2012/0088462 A1 | 4/2012 | Mader et al. | |
| 2013/0168503 A1 * | 7/2013 | Cooper | G08B 13/00 246/167 R |
| 2013/0344856 A1 * | 12/2013 | Silver | H04M 1/72577 455/418 |
| 2015/0186714 A1 | 7/2015 | Ren et al. | |
| 2015/0286885 A1 | 10/2015 | Bulan et al. | |

* cited by examiner

*Primary Examiner* — Thomas Mullen
(74) *Attorney, Agent, or Firm* — The Webb Law Firm

(57) ABSTRACT

A monitoring system for detecting a condition in a vehicle, including at least one imaging device having a field of view including at least a portion of an interior cabin of the vehicle occupied by an operator of the vehicle during operation, a data storage medium configured to store parameter data in a database, the parameter data including control parameter data for the interior cabin of the vehicle, and at least one processor in communication with the at least one imaging device and the data storage medium. The at least one processor is programmed or configured to receive operational image data from the at least one imaging device, generate operational parameter data from the operational image data, compare the operational parameter data to the control parameter data, and determine if at least one operator is absent from the interior cabin and/or if at least one unauthorized display device is present in the vehicle.

41 Claims, 7 Drawing Sheets

SYSTEM, METHOD, AND APPARATUS FOR DETECTING VEHICLE OPERATOR CONDUCT

BACKGROUND OF THE INVENTION

Field of the Invention

Disclosed embodiments relate generally to vehicle systems and, in particular, to a system, method, and apparatus of monitoring personnel within a vehicle cabin and detecting the use of unauthorized display devices by a vehicle operator or the absence of a vehicle operator from the cabin.

Description of Related Art

Vehicle systems and networks exist throughout the world, and, at any point in time, a multitude of vehicles, such as cars, trucks, buses, trains, and the like, are travelling throughout the system and network. Operators of many types of vehicles are governed by a strict set of regulations while in the vehicle cabin. For example, most train operators are prohibited from using personal display devices, such as smartphones, tablets, or laptops, while operating the train. Moreover, usually at least one operator is entrusted to remain in the train cab while the train is in operation, and vacating the cab may be a severe and dangerous breach of protocol. The same may be said with reference to the operation of cars, trucks, buses, trains, boats, and other transit vehicles.

Unauthorized display devices are strictly regulated because of the attention that is required to operate vehicles. A few moments of distraction may prevent an operator from timely noticing and reacting to route changes, oncoming danger, other vehicles, or mechanical failures of the vehicle. Likewise, an operator's physical presence in the cab is vital. Although many vehicles are operated by autopilot or external controls, if an operator vacates the cab, even for a short time, they are rendered unable to respond and safely control the vehicle. There is a need in the art to carefully monitor for these events, where inattention can cost time, money, and lives.

The compliance with such regulations has been enforced by the presence of other personnel, who are expected to report and/or resolve situations where an operator has breached protocol. However, personnel may inject personal bias or subjectivity, failing to report or rectify a situation when an operator uses a personal display device or vacates their controls. Moreover, the operator himself is unlikely to self-report such breaches and subject himself to correction. There is a need in the art to monitor, report, and record situations where an operator uses an unauthorized display device or vacates the vehicle cabin.

SUMMARY OF THE INVENTION

Generally, provided is a system and method for detecting the use of unauthorized display devices by a vehicle operator and a system and method for detecting the absence of vehicle operators and crew members from a vehicle cabin.

According to a preferred and non-limiting embodiment or aspect, provided is a monitoring system for detecting the presence of unauthorized display devices in a cabin of a vehicle. The system includes at least one imaging device having a field of view including an interior of the cabin occupied by an operator of the vehicle during operation. The system further includes a data storage medium configured to store parameter data in a database, the parameter data including control parameter data for the interior of the cabin. The system also includes at least one processor in communication with the at least one imaging device and the data storage medium, the at least one processor programmed or configured to: receive operational image data from the at least one imaging device; generate operational parameter data from the operational image data; compare the operational parameter data to the control parameter data; and determine if at least one unauthorized display device is present in the cabin based at least partially on the comparison between the operational parameter data and the control parameter data.

In non-limiting embodiments or aspects, at least one of the following: the parameter data, the control parameter data, the operational parameter data, or any combination thereof may include information or data representative of at least one of the following: thermal signals, object luminance, background luminance, object location, object pixel count, object pixel geometry, object movement, or any combination thereof. The at least one imaging device may be configured with a polarized filter, wherein the operational parameter data includes data representative of lower object luminance relative to background luminance. The lower object luminance may be representative of the at least one unauthorized display device emitting polarized light with a device polarization approximately perpendicular in axis to an imaging polarization. The at least one processor may be further programmed or configured to generate or edit the control parameter data stored in the database based on initial image data received from the at least one imaging device while the cabin is unoccupied. The control parameter data may include a representation of or information identifying at least one authorized display device.

In non-limiting embodiments or aspects, the at least one processor may be further programmed or configured to periodically receive the operational image data from the at least one imaging device and generate the operational parameter data from the operational image data while the vehicle is in operation. The control parameter data may be generated based on a portion of the operational parameter data corresponding to a prior time or time period, and the comparison between the control parameter data and the operational parameter data may include a comparison between the portion of the operational parameter data from the prior time or time period to a portion of the operational parameter data from a subsequent time or time period.

In non-limiting embodiments or aspects, the system may further include at least one alert device programmed or configured to communicate a notification or message to the operator in the cabin in response to determining that the at least one unauthorized display device is present in the cabin. The at least one alert device may include at least one of the following: a display screen, a speaker, a vibration motor, an indicator light, or any combination thereof. The at least one alert device may substantially continuously communicate the notification or message that the at least one unauthorized display device has been detected until the at least one processor determines that the at least one unauthorized display device is no longer detected. The at least one processor may be further programmed or configured to receive a response from the operator confirming or denying that the at least one unauthorized display device was present in the cabin.

In non-limiting embodiments or aspects, the system may further include at least one communication device located on or associated with the vehicle and configured to communicate, to a remote back office system or monitoring station, a notification or message that the at least one unauthorized display device was detected. The remote back office system or remote monitoring station may include at least one processor programmed or configured to, in response to receiving the notification or message that the at least one unauthorized display device was detected, implement or cause to be implemented at least one of the following: cause the vehicle to alter an aspect or parameter of its operation, notify the operator in the cabin that the at least one unauthorized display device was detected, record detection event data corresponding to detecting the at least one unauthorized display device, or any combination thereof. The at least one processor of the remote back office system or monitoring station may be further programmed or configured to cause the vehicle to stop responding to the operator's control, communicate to the operator that the at least one unauthorized display device was detected, and return control to the operator in response to the remote back office system or monitoring station receiving a notification or message that the at least one unauthorized display device is no longer detected.

In non-limiting embodiments or aspects, the system may further include an event database, associated with the vehicle or a remote back office system or monitoring station, programmed or configured to store data representative of unauthorized display device detection events, the data including at least one of the following: time data, vehicle identification data, operator identification data, or any combination thereof. The data may further include at least a portion of the operational image data received from the at least one imaging device from a time period during which the at least one unauthorized display device was detected. The vehicle may be a train and the at least one processor may include an on-board computer positioned on the train.

According to a further preferred and non-limiting embodiment or aspect, provided is a method for detecting the presence of unauthorized display devices in a cabin of a vehicle, the cabin including at least one imaging device having a field of view including at least a portion of an interior of the cabin. The method includes receiving operational image data from the at least one imaging device while the vehicle is being operated by an operator. The method also includes generating, with at least one processor, operational parameter data from the operational image data based on at least one of the following: thermal signals, a region of luminance, an object luminance, a background luminance, or any combination thereof. The method further includes: comparing, with at least one processor, the operational parameter data to control parameter data for the cabin stored in at least one data storage device; determining, with at least one processor, if at least one unauthorized display device is present in the cabin based on the comparison between the operational parameter data and the control parameter data; and in response to determining that at least one unauthorized display device is present in the cabin, generating an alert with at least one processor.

In non-limiting embodiments or aspects, the at least one imaging device may be configured with a polarized filter, wherein the operational parameter data includes data representative of lower object luminance relative to background luminance. The lower object luminance may be representative of the at least one unauthorized display device emitting polarized light with a device polarization approximately perpendicular in axis to an imaging polarization. The control parameter data may include parameter data that is predefined or generated from previous image data. The control parameter data may be generated from the previous image data, and the method may further include receiving the previous image data from the at least one imaging device while the vehicle is not in operation and the cabin is unoccupied, and generating the control parameter data based on the previous image data and at least one authorized display device present in the unoccupied cabin. Determining if the at least one unauthorized display device is present in the cabin may include determining whether the operational parameter data has a region of luminance that does not correspond to the at least one authorized display device.

In non-limiting embodiments or aspects, the method may further include periodically receiving the operational image data from the at least one imaging device, the operational parameter data being generated from the operational image data while the vehicle is in operation. The control parameter data may be generated based on a portion of the operational parameter data corresponding to a prior time or time period. The comparison between the control parameter data and the operational parameter data may include a comparison between the portion of the operational parameter data from the prior time or time period to a portion of the operational parameter data from a subsequent time or time period.

In non-limiting embodiments or aspects, the method may further include causing at least one alert device to communicate a notification or message to the operator in the cabin that the at least one unauthorized display device has been detected. The at least one alert device may include at least one of the following: a display screen, a speaker, a vibration motor, an indicator light, or any combination thereof. The at least one alert device may substantially continuously communicate the notification or message that the at least one unauthorized display device has been detected until the at least one processor determines that the at least one unauthorized display device is no longer detected. The method may further include receiving a response from the operator confirming or denying that the at least one unauthorized display device was present in the cabin.

In non-limiting embodiments or aspects, the method may further include communicating a notification or message to a remote back office system or monitoring station that the at least one unauthorized display device has been detected. The method may include, in response to receiving a communication from the remote back office system or monitoring station, implementing or causing the implementation of at least one of the following: causing the vehicle to alter an aspect or parameter of its operation, notifying the operator that the at least one unauthorized display device was detected in the cabin, recording detection event data corresponding to detecting the at least one unauthorized display device, or any combination thereof.

In non-limiting embodiments or aspects, the method may further include storing, in a database, unauthorized display device detection events including at least one of the following: time data, vehicle identification data, operator identification data, or a combination thereof. The unauthorized display device detection events stored in the database may further include at least a portion of the operational image data received from the at least one imaging device from a time period during which the at least one unauthorized display device was detected.

According to a further preferred and non-limiting embodiment or aspect, provided is an apparatus for detecting the presence of unauthorized display devices in a cabin of a vehicle, the cabin including at least one imaging device having a field of view including at least a portion of an interior of the cabin. The apparatus includes at least one non-transitory computer-readable medium having program instructions stored thereon that, when executed by at least one processor, cause the at least one processor to receive operational image data from the at least one imaging device while the vehicle is being operated. The instructions also cause the at least one processor to generate operational parameter data from the operational image data based on at least one of the following: thermal signals, a region of luminance, an object luminance, a background luminance, or any combination thereof. The instructions further cause the at least one processor to compare the operational parameter data to control parameter data for the cabin stored in at least one data storage device, determine if at least one unauthorized display device is present in the cabin based on the comparison between the operational parameter data and the control parameter data, and generate an alert in response to determining that at least one unauthorized display device is present in the cabin.

According to a further preferred and non-limiting embodiment or aspect, provided is a monitoring system for detecting a condition in a locomotive cab of a train, including at least one imaging device having a field of view including at least a portion of an interior of the locomotive cab occupied by an operator of the train during operation. The system also includes a data storage medium configured to store parameter data in a database, the parameter data including control parameter data for the interior of the locomotive cab. The system further includes at least one processor in communication with the at least one imaging device and the data storage medium, the at least one processor programmed or configured to: receive operational image data from the at least one imaging device; generate operational parameter data from the operational image data; compare the operational parameter data to the control parameter data; and determine, based at least partially on the comparison between the operational parameter data and the control parameter data, if at least one operator of the train is absent from the interior of the locomotive cab, if at least one unauthorized display device is present in the locomotive cab, or any combination thereof.

In non-limiting embodiments or aspects, the at least one imaging device may be configured with a polarized filter, wherein the operational parameter data includes data representative of lower object luminance relative to background luminance. The lower object luminance may be representative of the at least one unauthorized display device emitting polarized light with a device polarization approximately perpendicular in axis to an imaging polarization. The at least one processor may be further programmed or configured to generate the control parameter data based on initial image data received from the at least one imaging device while the interior of the locomotive cab is unoccupied.

In non-limiting embodiments or aspects, the at least one processor may be further programmed or configured to periodically receive the operational image data from the at least one imaging device, generate operational parameter data from the operational image data while the train is in operation, and edit the database to update the control parameter data of the interior of the locomotive cab. The control parameter data may be generated based on a portion of the operational parameter data corresponding to a prior time or time period. The comparison between the control parameter data and the operational parameter data may include a comparison between the portion of the operational parameter data from the prior time or time period to a portion of the operational parameter data from a subsequent time or time period.

In non-limiting embodiments or aspects, the system may further include at least one alert device programmed or configured to communicate a notification or message to the locomotive cab in response to determining that the at least one unauthorized display device is present in the locomotive cab or that the at least one operator of the train is absent from the interior of the locomotive cab. The at least one alert device may include at least one of the following: a display screen, a speaker, a vibration motor, an indicator light, or any combination thereof. The at least one alert device may substantially continuously communicate the notification or message to the locomotive cab that the at least one unauthorized display device has been detected or that the at least one operator of the train is absent from the interior of the locomotive cab until the at least one processor determines that the at least one unauthorized display device is no longer detected or that the at least one operator of the train is present in the interior of the locomotive cab.

In non-limiting embodiments or aspects, the system may further include at least one communication device located on or associated with the train and configured to communicate, to a remote back office system or monitoring station, a notification or message that the at least one unauthorized display device was detected or that the at least one operator of the train is absent from the interior of the locomotive cab. The remote back office system or remote monitoring station may include at least one processor programmed or configured to, in response to receiving the notification or message that the at least one unauthorized display device was detected or that the at least one operator of the train is absent from the interior of the locomotive cab, implement or cause to be implemented at least one of the following: causing the train to alter an aspect or parameter of its operation, notifying the operator in the locomotive cab that the at least one unauthorized display device was detected, communicating with the locomotive cab that the at least one operator of the train is absent from the interior of the locomotive cab, recording event data corresponding to detecting the at least one unauthorized display device, or any combination thereof. The at least one processor of the remote back office system or monitoring station may be further programmed or configured to cause the train to stop responding to the operator's control and return control to the operator in response to the remote back office system or monitoring station receiving the notification or message that the at least one unauthorized display device is no longer detected or that the at least one operator is present.

In non-limiting embodiments or aspects, the system may further include a database, associated with the train or a remote back office system or remote monitoring station, configured to store data representative of unauthorized display device detection events or unoccupied locomotive cab detection events. The data may include at least one of the following: time data, train identification data, operator identification data, or any combination thereof. The data may further include at least a portion of the operational image data received from the at least one imaging device from a time period during which the at least one unauthorized display device or the absence of the at least one operator was detected. The at least one processor may include an on-board computer positioned on the train.

Further preferred and non-limiting embodiments or aspects will now be described in the following numbered clauses.

Clause 1: A monitoring system for detecting the presence of unauthorized display devices in a cabin of a vehicle, comprising: (a) at least one imaging device having a field of view including an interior of the cabin occupied by an operator of the train during operation; (b) a data storage medium configured to store parameter data in a database, the parameter data comprising control parameter data for the interior of the cabin; and (c) at least one processor in communication with the at least one imaging device and the data storage medium, the at least one processor programmed or configured to: (i) receive operational image data from the at least one imaging device; (ii) generate operational parameter data from the operational image data; (iii) compare the operational parameter data to the control parameter data; and (iv) determine if at least one unauthorized display device is present in the cabin based at least partially on the comparison between the operational parameter data and the control parameter data.

Clause 2: The monitoring system of clause 1, wherein at least one of the following: the parameter data, the control parameter data, the operational parameter data, or any combination thereof comprises information or data representative of at least one of the following: thermal signals, object luminance, background luminance, object location, object pixel count, object pixel geometry, object movement, or any combination thereof.

Clause 3: The monitoring system of clause 1 or 2, wherein the at least one imaging device is configured with a polarized filter, wherein the operational parameter data comprises data representative of lower object luminance relative to background luminance, the lower object luminance representative of the at least one unauthorized display device emitting polarized light with a device polarization approximately perpendicular in axis to an imaging polarization.

Clause 4: The monitoring system of any of clauses 1-3, wherein the at least one processor is further programmed or configured to generate or edit the control parameter data stored in the database based on initial image data received from the at least one imaging device while the cabin is unoccupied, wherein the control parameter data comprises a representation of or information identifying at least one authorized display device.

Clause 5: The monitoring system of any of clauses 1-4, wherein the at least one processor is further programmed or configured to periodically receive the operational image data from the at least one imaging device and generate the operational parameter data from the operational image data while the vehicle is in operation, and wherein the control parameter data is generated based on a portion of the operational parameter data corresponding to a prior time or time period, and wherein the comparison between the control parameter data and the operational parameter data comprises a comparison between the portion of the operational parameter data from the prior time or time period to a portion of the operational parameter data from a subsequent time or time period.

Clause 6: The monitoring system of any of clauses 1-5, further comprising at least one alert device programmed or configured to communicate a notification or message to the operator in the cabin in response to determining that the at least one unauthorized display device is present in the cabin.

Clause 7: The monitoring system of any of clauses 1-6, wherein the at least one alert device comprises at least one of the following: a display screen, a speaker, a vibration motor, an indicator light, or any combination thereof.

Clause 8: The monitoring system of any of clauses 1-7, wherein the at least one alert device substantially continuously communicates the notification or message that the at least one unauthorized display device has been detected until the at least one processor determines that the at least one unauthorized display device is no longer detected.

Clause 9: The monitoring system of any of clauses 1-8, wherein the at least one processor is further programmed or configured to receive a response from the operator confirming or denying that the at least one unauthorized display device was present in the cabin.

Clause 10: The monitoring system of any of clauses 1-9, further comprising at least one communication device located on or associated with the vehicle and configured to communicate, to a remote back office system or monitoring station, a notification or message that the at least one unauthorized display device was detected.

Clause 11: The monitoring system of any of clauses 1-10, wherein the remote back office system or remote monitoring station comprises at least one processor programmed or configured to, in response to receiving the notification or message that the at least one unauthorized display device was detected, implement or cause to be implemented at least one of the following: cause the vehicle to alter an aspect or parameter of its operation, notify the operator in the cabin that the at least one unauthorized display device was detected, record detection event data corresponding to detecting the at least one unauthorized display device, or any combination thereof.

Clause 12: The monitoring system of any of clauses 1-11, wherein the at least one processor of the remote back office system or monitoring station is further programmed or configured to: cause the vehicle to stop responding to the operator's control; communicate to the operator that the at least one unauthorized display device was detected; and return control to the operator in response to the remote back office system or monitoring station receiving a notification or message that the at least one unauthorized display device is no longer detected.

Clause 13: The monitoring system of any of clauses 1-12, further comprising an event database, associated with the vehicle or a remote back office system or monitoring station, programmed or configured to store data representative of unauthorized display device detection events, the data comprising at least one of the following: time data, vehicle identification data, operator identification data, or any combination thereof.

Clause 14: The monitoring system of any of clauses 1-13, wherein the data further comprises at least a portion of the operational image data received from the at least one imaging device from a time period during which the at least one unauthorized display device was detected.

Clause 15: The monitoring system of any of clauses 1-14, wherein the vehicle is a train and the at least one processor comprises an on-board computer positioned on the vehicle.

Clause 16: A method for detecting the presence of unauthorized display devices in a cabin of a vehicle, wherein the cabin comprises at least one imaging device having a field of view including at least a portion of an interior of the cabin, the method comprising: receiving operational image data from the at least one imaging device while the vehicle is being operated by an operator; generating, with at least one processor, operational parameter data from the operational image data based on at least one of the following: thermal signals, a region of luminance, an object luminance, a background luminance, or any combination thereof; comparing, with at least one processor, the operational parameter data to control parameter data for the cabin stored in at least one data storage device; determining, with at least one processor, if at least one unauthorized display device is present in the cabin based on the comparison between the operational parameter data and the control parameter data; and in response to determining that at least one unauthorized display device is present in the cabin, generating an alert with at least one processor.

Clause 17: The method of clause 16, wherein the at least one imaging device is configured with a polarized filter, wherein the operational parameter data comprises data representative of lower object luminance relative to background luminance, the lower object luminance representative of the at least one unauthorized display device emitting polarized light with a device polarization approximately perpendicular in axis to an imaging polarization.

Clause 18: The method of clause 16 or 17, wherein the control parameter data comprises parameter data that is predefined or generated from previous image data.

Clause 19: The method of any of clauses 16-18, wherein the control parameter data is generated from the previous image data, the method further comprising: receiving the previous image data from the at least one imaging device while the vehicle is not in operation and the cabin is unoccupied; and generating the control parameter data based on the previous image data and at least one authorized display device present in the unoccupied cabin, wherein determining if the at least one unauthorized display device is present in the cabin comprises determining whether the operational parameter data comprises a region of luminance that does not correspond to the at least one authorized display device.

Clause 20: The method of any of clauses 16-19, further comprising periodically receiving the operational image data from the at least one imaging device, wherein the operational parameter data is generated from the operational image data while the vehicle is in operation, wherein the control parameter data is generated based on a portion of the operational parameter data corresponding to a prior time or time period, and wherein the comparison between the control parameter data and the operational parameter data comprises a comparison between the portion of the operational parameter data from the prior time or time period to a portion of the operational parameter data from a subsequent time or time period.

Clause 21: The method of any of clauses 16-20, further comprising causing at least one alert device to communicate a notification or message to the operator in the cabin that the at least one unauthorized display device has been detected, wherein the at least one alert device comprises at least one of the following: a display screen, a speaker, a vibration motor, an indicator light, or any combination thereof.

Clause 22: The method of any of clauses 16-21, wherein the at least one alert device substantially continuously communicates the notification or message that the at least one unauthorized display device has been detected until the at least one processor determines that the at least one unauthorized display device is no longer detected.

Clause 23: The method of any of clauses 16-22, further comprising receiving a response from the operator confirming or denying that the at least one unauthorized display device was present in the cabin.

Clause 24: The method of any of clauses 16-23, further comprising communicating a notification or message to a remote back office system or monitoring station that the at least one unauthorized display device has been detected.

Clause 25: The method of any of clauses 16-24, further comprising, in response to receiving a communication from the back office system or remote monitoring station, implementing or causing the implementation of at least one of the following: causing the vehicle to alter an aspect or parameter of its operation, notifying the operator that the at least one unauthorized display device was detected in the cabin, recording detection event data corresponding to detecting the at least one unauthorized display device, or any combination thereof.

Clause 26: The method of any of clauses 16-25, further comprising storing, in a database, unauthorized display device detection events comprising at least one of the following: time data, vehicle identification data, operator identification data, or a combination thereof.

Clause 27: The method of any of clauses 16-26, wherein the unauthorized display device detection events stored in the database further comprise at least a portion of the operational image data received from the at least one imaging device from a time period during which the at least one unauthorized display device was detected.

Clauses 28: An apparatus for detecting the presence of unauthorized display devices in a cabin of a vehicle, wherein the cabin comprises at least one imaging device having a field of view including at least a portion of an interior of the cabin, the apparatus comprising at least one non-transitory computer-readable medium having program instructions stored thereon that, when executed by at least one processor, cause the at least one processor to: receive operational image data from the at least one imaging device while the vehicle is being operated; generate operational parameter data from the operational image data based on at least one of the following: thermal signals, a region of luminance, an object luminance, a background luminance, or any combination thereof; compare the operational parameter data to control parameter data for the cabin stored in at least one data storage device; determine if at least one unauthorized display device is present in the cabin based on the comparison between the operational parameter data and the control parameter data; and generate an alert in response to determining that at least one unauthorized display device is present in the cabin.

Clause 29: A monitoring system for detecting a condition in a locomotive cab of a train, comprising: (a) at least one imaging device having a field of view including at least a portion of an interior of the locomotive cab occupied by an operator of the train during operation; (b) a data storage medium configured to store parameter data in a database, the parameter data comprising control parameter data for the interior of the locomotive cab; and (c) at least one processor in communication with the at least one imaging device and the data storage medium, the at least one processor programmed or configured to: (i) receive operational image data from the at least one imaging device; (ii) generate operational parameter data from the operational image data; (iii) compare the operational parameter data to the control parameter data; and (iv) determine, based at least partially on the comparison between the operational parameter data and the control parameter data, at least one of the following: if at least one operator of the train is absent from the interior of the locomotive cab, if at least one unauthorized display device is present in the locomotive cab, or any combination thereof.

Clause 30: The system of clause 29, wherein the at least one imaging device is configured with a polarized filter, wherein the operational parameter data comprises data representative of lower object luminance compared to background luminance, the lower object luminance representative of the at least one unauthorized display device emitting polarized light with a device polarization approximately perpendicular in axis to an imaging polarization.

Clause 31: The monitoring system of clause 29 or 30, wherein the at least one processor is further programmed or configured to generate the control parameter data based on initial image data received from the at least one imaging device while the interior of the locomotive cab is unoccupied.

Clause 32: The monitoring system of any of clauses 29-31, wherein the at least one processor is further programmed or configured to periodically receive the operational image data from the at least one imaging device, generate operational parameter data from the operational image data while the train is in operation, and edit the database to update the control parameter data of the interior of the locomotive cab, wherein the control parameter data is generated based on a portion of the operational parameter data corresponding to a prior time or time period, and wherein the comparison between the control parameter data and the operational parameter data comprises a comparison between the portion of the operational parameter data from the prior time or time period to a portion of the operational parameter data from a subsequent time or time period.

Clause 33: The monitoring system of any of clauses 29-32, further comprising at least one alert device programmed or configured to communicate a notification or message to the locomotive cab in response to determining that the at least one unauthorized display device is present in the locomotive cab or that the at least one operator of the train is absent from the interior of the locomotive cab.

Clause 34: The monitoring system of any of clauses 29-33, wherein the at least one alert device comprises at least one of the following: a display screen, a speaker, a vibration motor, an indicator light, or any combination thereof.

Clause 35: The monitoring system of any of clauses 29-34, wherein the at least one alert device substantially continuously communicates the notification or message to the locomotive cab that the at least one unauthorized display device has been detected or that the at least one operator of the train is absent from the interior of the locomotive cab until the at least one processor determines that the at least one unauthorized display device is no longer detected or that the at least one operator of the train is present in the interior of the locomotive cab.

Clause 36: The monitoring system of any of clauses 29-35, further comprising at least one communication device located on or associated with the train and configured to communicate, to a remote back office system or monitoring station, a notification or message that the at least one unauthorized display device was detected or that the at least one operator of the train is absent from the interior of the locomotive cab.

Clause 37: The monitoring system of any of clauses 29-36, wherein the remote back office system or remote monitoring station comprises at least one processor programmed or configured to, in response to receiving the notification or message that the at least one unauthorized display device was detected or that the at least one operator of the train is absent from the interior of the locomotive cab, implement or cause to be implemented at least one of the following: cause the train to alter an aspect or parameter of its operation, notify the operator in the locomotive cab that the at least one unauthorized display device was detected, communicate with the locomotive cab that the at least one operator of the train is absent from the interior of the locomotive cab, record event data corresponding to detecting the at least one unauthorized display device, or any combination thereof.

Clause 38: The monitoring system of any of clauses 29-37, wherein the at least one processor of the remote back office system or monitoring station is further programmed or configured to: cause the train to stop responding to the operator's control; and return control to the operator in response to the remote back office system or monitoring station receiving the notification or message that the at least one unauthorized display device is no longer detected or that the at least one operator is present.

Clause 39: The monitoring system of any of clauses 29-38, further comprising a database, associated with the train or a remote back office system or remote monitoring station, configured to store data representative of unauthorized display device detection events or unoccupied locomotive cab detection events, the data comprising at least one of the following: time data, train identification data, operator identification data, or any combination thereof.

Clause 40: The monitoring system of any of clauses 29-39, wherein the data further comprises at least a portion of the operational image data received from the at least one imaging device from a time period during which the at least one unauthorized display device or the absence of the at least one operator was detected.

Clause 41: The monitoring system of any of clauses 29-40, wherein the at least one processor comprises an on-board computer positioned on the train.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
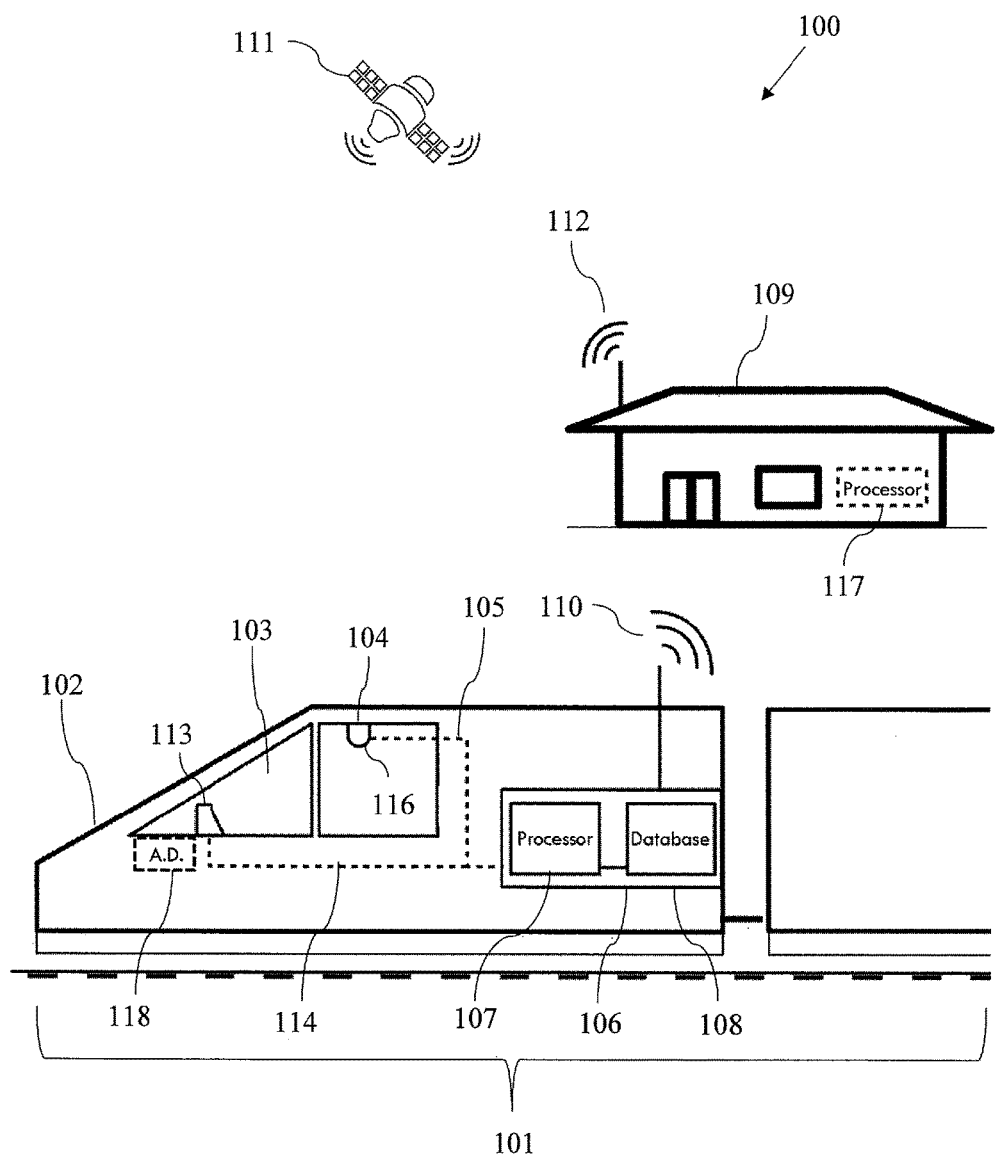
FIG. 1 is a schematic diagram of one embodiment or aspect of a system for detecting the use of unauthorized display devices or absence of an operator in a vehicle cabin, according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and process illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, Global System for Mobile Communications (GSM), and/or the like.

As used herein, the term "luminance" refers to the photometric measure of the luminous intensity per unit area of light travelling in a given direction. Specifically with regard to measuring the luminance of a display device, "luminance" refers to the measurement of the amount of light, falling within a given solid angle, that is emitted from or reflected off the display device. As used herein, a "region of luminance" is an area of an image that contains comparatively higher or lower luminance relative to surrounding objects or features, such as those caused by objects that emit light or by objects that emit polarized light and are dimmed or blacked out by a polarized imaging device. Regions of luminance may be the result of backlit and/or polarized computer screens, phones, tablets, laptops, or other illuminated or light-filtered devices. Also as used herein, the term "luminance" may mean relative luminance, which follows the photometric definition of luminance but has luminance values normalized to a reference color (e.g., white) for ease of mathematic comparison. For example, one such known normalization formula for calculating relative luminance "Y" is through the weighted addition of the red/green/blue (RGB) components of a given image color: $Y=(0.2126 R+0.7152 G+0.0722 B)/255$. The RGB components in this formula range from 0 to 255. White, having an RGB value of R=255, G=255, and B=255, has a relative luminance of Y=1. The color green has a higher weighted value because it is known to contribute the most to the intensity of light perceived by humans. It will be appreciated that the values of the weights may be adjusted both to account for variance in image capture and to test the tolerance of varying the weights. It will also be appreciated that luminance may be measured in grayscale, the value for which can be based on a value for a grayscale pixel. The luminance of an entire image may be calculated by geometrically averaging all of the component pixels. In other examples, the image may be segmented into smaller subsections of pixels, e.g., an individual pixel or more, that are averaged for luminance values. These smaller sections can be compared to one another or data from past images to identify regions of luminance. It will be appreciated, therefore, that luminance may be measured and compared by various subsections of color and/or luminosity, relative to a reference color and/or luminosity.

With specific reference to FIG. 1, shown is a schematic diagram of a system 100 for detecting the use of unauthorized display devices or the absence of an operator in a vehicle cabin according to one preferred and non-limiting embodiment or aspect. Depicted is a train 101 having a locomotive 102, which contains an interior cabin (hereinafter referred to as "cab") 103. Deployed in the cab 103 is an imaging device 104, which may include any type of sensor or device capable of capturing image data such as, but not limited to, a camera, a semiconductor charge-coupled device, active pixel sensors, infrared sensors, and/or the like. As shown, the imaging device 104 is mounted and arranged in a position such that it can view at least a portion of the operator's station, which may include but is not limited to the operator seat, operator controls, and/or surrounding area. Although a single imaging device 104 is depicted as being mounted to the ceiling of the cab in FIG. 1, it will be appreciated that the imaging device 104 can be positioned elsewhere in the cab 103, given a field of view sufficient to account for the operator's actions, such as in the front of the cab or behind the operator. Moreover, the system 100 may include one or more additional imaging devices to combine or coordinate different fields of view. The imaging device 104 has a communicative connection 105 to a head-end unit (HEU) 106, which contains a processor 107, e.g., an on-board computer or other computing device, and a data storage device 108 including one or more databases. The databases may include, as an example, a registry of parameter data associated with the vehicle cabin 103. The signals from the imaging device 104 include image data that is communicated along the connection 105 to the processor 107, which analyzes the graphical input to determine if an unauthorized display device is in the cab 103, or if the operator is absent from the cab 103. Although the system 100 is depicted for deployment in a locomotive, it will be appreciated that the system 100 may also be deployed in other vehicles with similar operator restrictions and vehicle cabs, such as airplanes, boats, buses, cars, and/or the like.

With further reference to FIG. 1, and in a further preferred and non-limiting embodiment or aspect, if the processor 107 determines that there is an unauthorized display device in the cab 103, or that the operator has vacated the cab 103, the HEU 106 locally records a detection event in the database 108 and communicates the detection event to a remote monitoring station 109. In a preferred and non-limiting embodiment, the remote monitoring station 109 is a back office system (BOS) including one or more processors 117, e.g., server computers. However, it will be appreciated that a remote monitoring station 109 may also be dedicated to the system 100 and/or another remote device or system. Depicted is one example of communicating the detection event, wherein the HEU 106 is in communication with a communication device 110, e.g., a transceiver, which communicates the detection event via satellite 111 to the remote monitoring station 109, which is also equipped with a remote communication device 112, e.g., a transceiver. It will be appreciated that communication with the remote monitoring station 109 may be achieved by a number of alternative techniques and protocols, e.g., cellular communications, radio communications, Internet communications, train-to-wayside device communications, and/or any other similar means. The remote monitoring station 109 may then act on the detection event signal in any number of ways, such as storing the detection event or information associated therewith, communicating with the train 101, identifying the train 101 or operator history, taking control of the train 101, and/or requesting, receiving, or further analyzing the parameter data.

With further reference to FIG. 1, and in a further preferred and non-limiting embodiment or aspect, the remote monitoring station 109 may communicate with the train 101 via the remote communication device 112. As depicted, the train 101 is further equipped with an authorized display device 113, which is deployed in the cab 103 for the operator to view data, communicate, and interact. The authorized display device 113 has a communicative connection 114 to the HEU 106, which relays the remote monitoring station's 109 communication, which is received by the communication device 110 on the train 101. For example, after a detection event, the system 100 may generate an alert by using an alert device 118. An alert may include sounding an audible alarm, triggering a vibration motor, illuminating an indicator light, displaying a message, and/or the like. In the case of detecting an unauthorized display device, the remote monitoring station 109 may communicate an alert to the train 101, the alert displayed as a message on the authorized display device 113, which may include a prompt for the operator such as "Unauthorized display device detected. Please stow immediately. Press 'Y' to confirm. Press 'N' to report false alarm." Alternatively, when an operator's absence is detected, the prompt may be: "Operator absent from cab. Press 'Y' to confirm and report operator's return to cab. Press 'N' to report false alarm." The operator's response may then be communicated back through the communicative connection 114 to the HEU 106 and sent back to the remote monitoring station 109. At any point, given the communicative connection between the train 101 and the remote monitoring station 109, the remote monitoring station 109 and/or personnel at the remote monitoring station 109 may take temporary control of the train 101 to slow or cease its movement until the event has passed or the operator has responded satisfactorily. Furthermore, it will be appreciated that the operations conducted by the processor 107 may be carried out anywhere on the vehicle or remotely. For example, if the vehicle is a train 101, the processor 107 may be part of an on-board computer in the locomotive 102 or part of an end-of-train (EOT) device (not shown). Other variations are possible.

Figure 2:
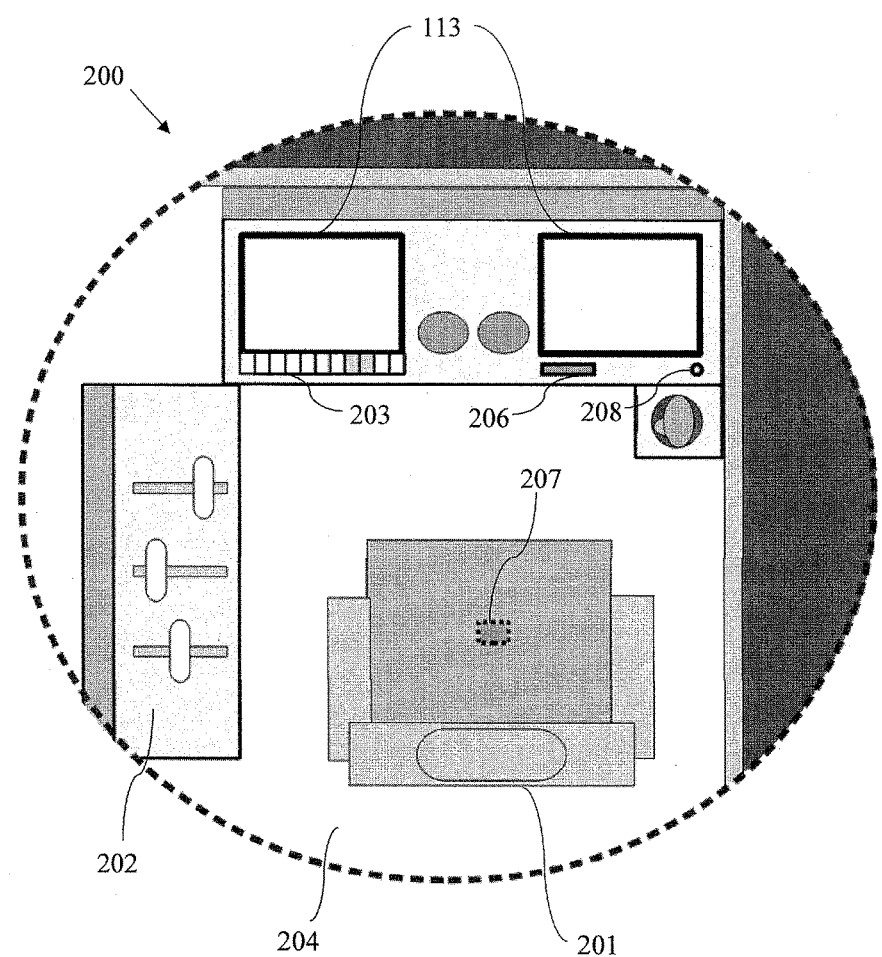
FIG. 2 is a schematic diagram of one embodiment or aspect of a system for detecting the use of unauthorized display devices or absence of an operator in a vehicle cabin, according to the principles of the present invention.

With specific reference to FIG. 2, and in one preferred and non-limiting embodiment or aspect, provided is an overhead field of view 200 from a monitoring imaging device in a locomotive cab, as observed prior to disembark. As depicted, the imaging device is positioned in such a way as to provide a field of view 200 that encompasses the operator seat 201, authorized display devices 113, train controls 202, interface controls 203, and surrounding cab area 204. It will be appreciated that the imaging device positioning in FIG. 2 is for illustrative purposes only, and the imaging device may be positioned elsewhere in the cab, such as the front of the cabin or behind the operator. Before the train disembarks, the imaging device surveys the empty cab to obtain initial image data representing one or more fields of view of the vehicle cabin that may include, for example, one or more bitmaps, vectors, videos, imaging device signals, and/or any other type of data representative of a visual image or series of visual images. Furthermore, the locomotive cab may include at least one alert device programmed or configured to communicate a notification or message, the alert device including an authorized display device 113, a speaker 206, a vibration motor 207, an indicator light 208, or any combination thereof.

With continued reference to FIG. 2, control parameter data is generated by processing the initial image data and may include, for example, object data, luminance data, color data, and/or other information or parameters about the content of the image data. The control parameter data may be used later to compare with operational parameter data that is generated from operational image data representing one or more fields of view of the vehicle cabin while the vehicle is being operated. The operational parameter data may likewise include, for example, thermal data, object data, luminance data, color data, and/or other information about the content of the operational image data. Specifically for the detection of unauthorized display devices, the initial image data may be processed according to one or more algorithms to determine the location of any authorized display devices 113, which are represented by the control parameter data. For example, the initial image data may be processed to determine regions of luminance that remain stationary relative to the other cab features, such as the train controls 202 or operator seat 201. These areas of stationary luminance in the empty cab may correspond to authorized display devices 113, e.g., display screens or graphical controls, which are necessary for operation of the vehicle. The control parameter data of the empty cab, including parameter data of any authorized display devices 113, may then be stored in the database for later comparison. It will be appreciated that the initial image data may also be processed and analyzed via remote computers to generate the control parameter data, which may be stored in remote databases.

Figure 3:
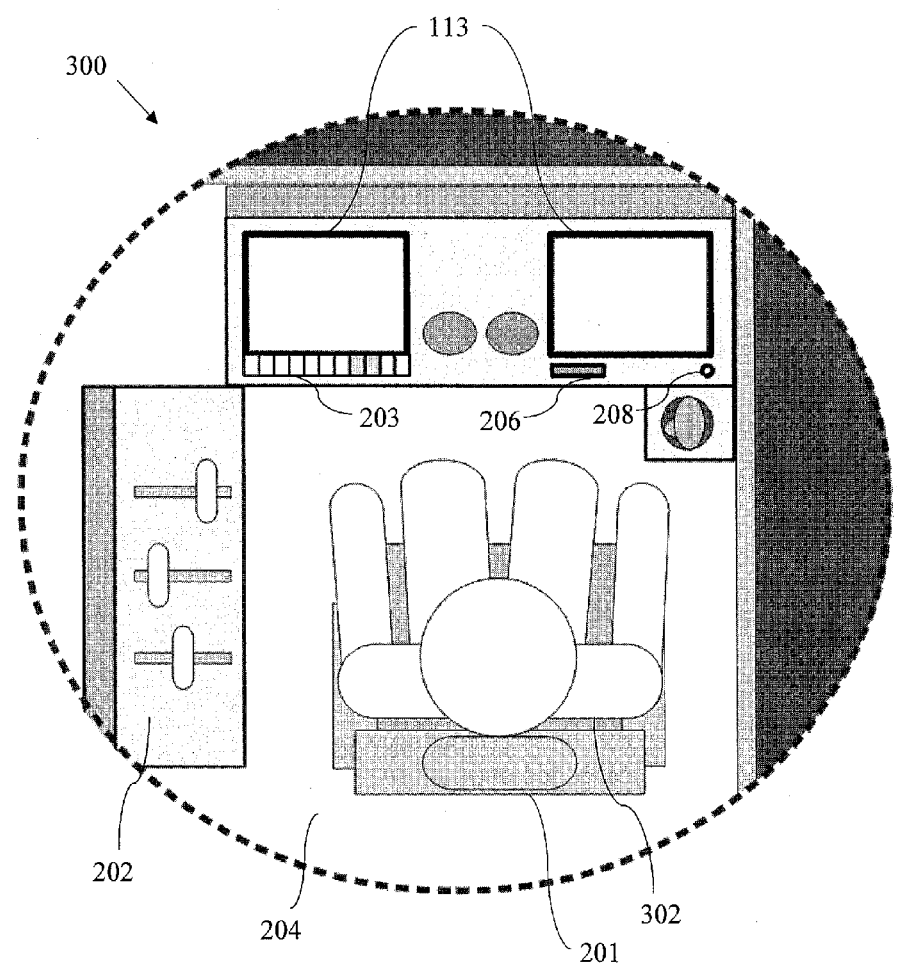
FIG. 3 is a schematic diagram of one embodiment or aspect of a system for detecting the use of unauthorized display devices or absence of an operator in a vehicle cabin, according to the principles of the present invention.

With specific reference to FIG. 3, and in one preferred and non-limiting embodiment or aspect, provided is an overhead field of view 300 from a monitoring imaging device in a locomotive cab during operation when no unauthorized display devices are present. As depicted, the imaging device is positioned in such a way as to provide a field of view 200 that encompasses the operator seat 201, authorized display devices 113, train controls 202, interface controls 203, and surrounding cab area 204. Operational parameter data is generated from operational image data obtained by the imaging device while the locomotive is operating. The operational image data may be a still image that is taken at regular intervals or in response to an event. For example, if the imaging device is a video camera having a capture framerate, the operational image data may be captured at predefined frame intervals. If the imaging device is a still camera, the operational image data may likewise be obtained at predefined intervals. It will also be appreciated that, in some embodiments, the system 100 may operate using continually-changing (e.g., real-time) image data input such that different steps may be using different input image data. Furthermore, the locomotive cab may include at least one alert device programmed or configured to communicate a notification or message, the alert device including an authorized display device 113, a speaker 206, a vibration motor, an indicator light 208, or any combination thereof.

As shown, the operator 302 is positioned in the operator seat 201, facing forward and focusing on operating the locomotive down the track. During operation, the imaging device relays operational image data to the processor for analysis, which generates the operational parameter data from the operational image data and compares the operational parameter data to the control parameter data. With specific reference to detecting unauthorized display devices, the operational parameter data is analyzed for regions of luminance, which are compared to parameter data of authorized display devices 113 stored in the database. As shown in the field of view 300, the only regions of luminance present are those of the authorized display devices, so the processor would not detect or register any unauthorized devices. With specific reference to detecting the absence of the operator 302 from the cab, the operational parameter data is analyzed for large graphical differences from the control parameter data, which establish that the operator 302 is likely present. As shown in the field of view 300, the operator 302 is in fact present, therefore the operational parameter data will significantly differ from the control parameter data. If the operator was instead absent, the operational parameter data would substantially match the control parameter data, and the processor would record and report the operator's absence. Furthermore, it will be appreciated that multiple instances of operational parameter data generated from operational image data captured over time may be used to detect the sudden presence of authorized display devices or absences of the operator. Frame-by-frame comparisons may be used to reduce false positives and account for shifts in lighting or image quality.

Figure 4:
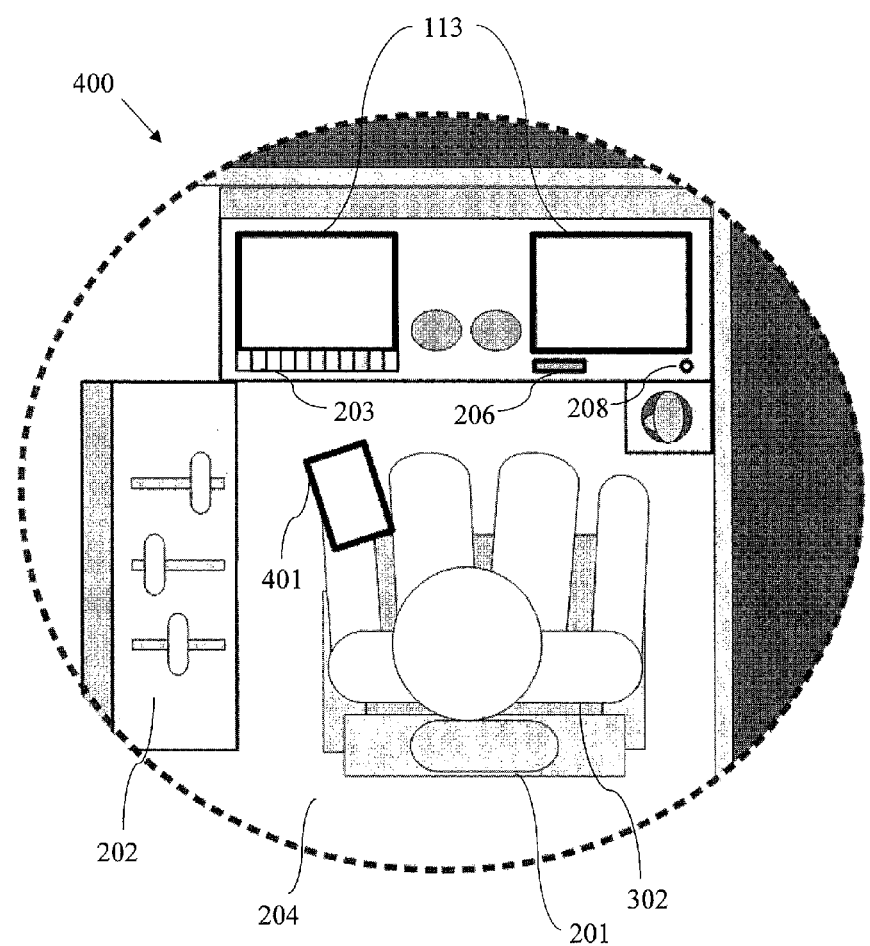
FIG. 4 is a schematic diagram of one embodiment or aspect of a system for detecting the use of unauthorized display devices in a vehicle cabin, according to the principles of the present invention.

With specific reference to FIG. 4, and in one preferred and non-limiting embodiment or aspect, provided is an overhead field of view 400 from a monitoring imaging device in the locomotive cab shown in FIG. 3 during operation when an unauthorized display device 401 is present. As depicted, the imaging device is positioned in such a way as to provide a field of view 400 that encompasses the operator seat 201, authorized display devices 113, train controls 202, interface controls 203, and surrounding cab area 204. Operational parameter data is generated from operational image data obtained by the imaging device while the locomotive is operating. As shown, the operator 302 is positioned in the operator seat 201, facing forward and holding an unauthorized display device 401. During operation, the imaging device relays the operational image data to the processor for analysis, which generates the operational parameter data from the operational image data and compares the operational parameter data to the control parameter data. With specific reference to detecting unauthorized display devices, the operational parameter data is analyzed for regions of luminance, which are compared to the parameter data of authorized display devices 113 that are stored in the database. As shown in the field of view 400, there are three regions of luminance: two produced by the authorized display devices 113, and one produced by the unauthorized display device 401. In the above comparison, the processor detects the extra region of luminance not present in the control image, thereby detecting the unauthorized display device 401.

In non-limiting embodiments, and with continued reference to FIG. 4, the processor may detect the unauthorized display device 401 by tracing the movement of the regions of luminance relative to a stationary field of view 400 or other stationary visual markers, e.g., the train controls 202 or the operator seat 201. Authorized display devices 113 are often stationary relative to the cab because they are affixed to the interior of the cab. In contrast, an unauthorized display device 401 is often not affixed to the cab, having movement when held in the hand or on a non-affixed surface and thereby producing small independent movements. It will be appreciated that all of the above methods for detecting an unauthorized display device 401, which entail comparisons to the control parameter data, can be employed to detect multiple unauthorized display devices 401 in the cab. Furthermore, multiple instances of operational parameter data generated from operational image data captured over time may be compared to one another to track the regions of luminance, detect the sudden presence of an unauthorized display device 401, account for changes in lighting or image quality, and reduce false positives.

In non-limiting embodiments, and with continued reference to FIG. 4, the monitoring imaging device may be configured with a polarized filter 116, e.g., a film, cover, layer, and/or the like. Certain unauthorized display devices 401, e.g., LCD or OLED displays, may emit polarized light due to a polarized filter 116 applied to the unauthorized display device 401 surface. When an unauthorized display device 401 is rotated such that the polarization of the unauthorized display device 401 is approximately perpendicular in axis to the polarization of the imaging device, most or all light emitted by the unauthorized display device 401 will be prevented from entering the imaging device. This creates a visual effect, which may manifest in the operational parameter data, of dimming, blacking out, or "blanking" the display of the unauthorized display device 401. The luminance of an unauthorized display device 401 in such a configuration may be comparatively less relative to background luminance, and therefore, may be used to determine a lesser region of luminance that may be associated with the unauthorized display device 401. Additionally, authorized display devices 113 may be configured with a non-polarized display or may be configured with a polarized filter 116 that is approximately parallel in axis to the polarization of the imaging device, such that the blacking out effect does not occur to the authorized display devices 113. Alternatively, authorized display devices 113 may be configured with a polarized film or cover that is approximately perpendicular in axis to the polarization of the imaging device, such that authorized display devices 113 are intentionally blacked out or dimmed. It will be also appreciated that the geometry of unauthorized display devices 401 may be tracked in motion, particularly through rotation, to detect the occurrence of blacking out due to polarization of an unauthorized display device 401. Furthermore, the locomotive cab may include at least one alert device programmed or configured to communicate a notification or message, the alert device including an authorized display device 113, a speaker 206, a vibration motor, an indicator light 208, or any combination thereof.

Figure 5:
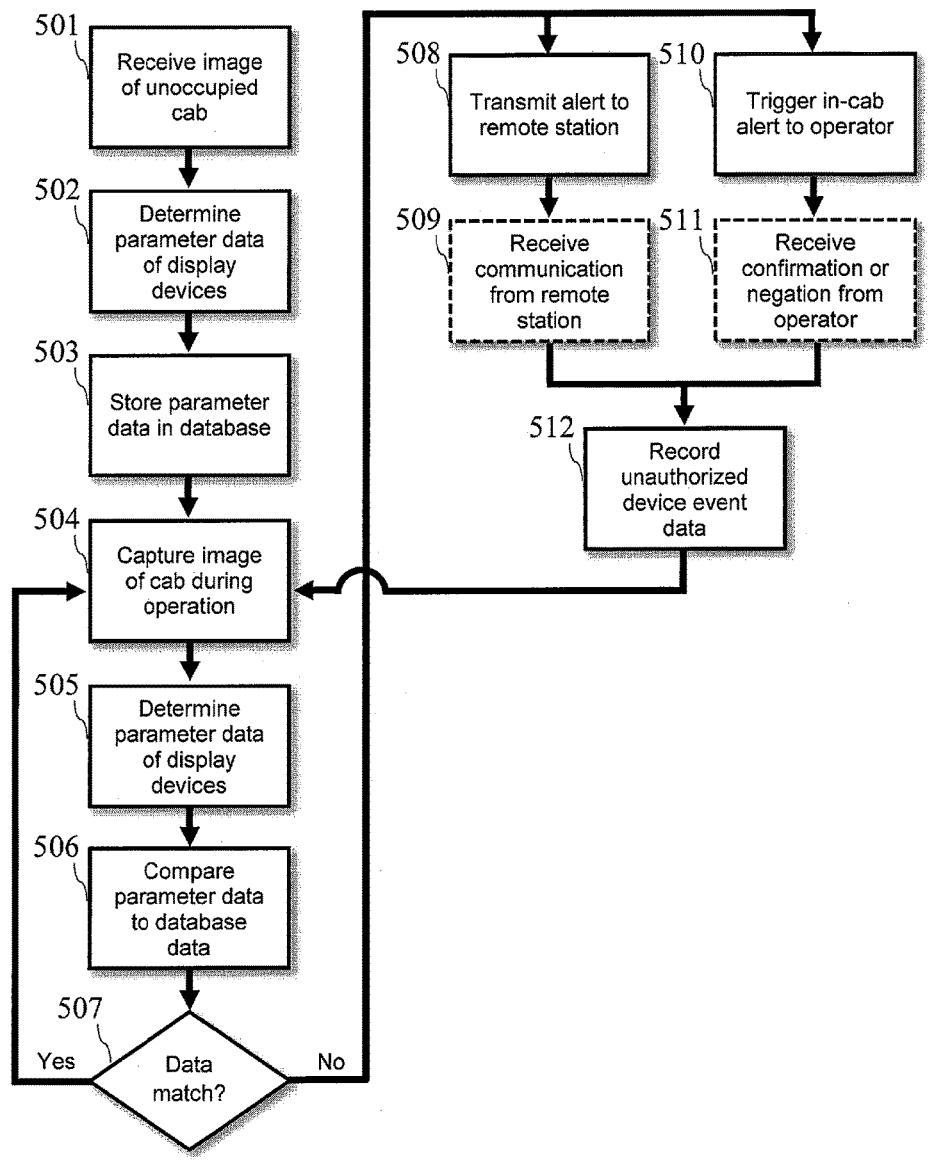
FIG. 5 is a step diagram of a method for detecting the use of unauthorized display devices in a vehicle cabin, according to the principles of the present invention.

With specific reference to FIG. 5, shown is a step diagram of a method for detecting the use of unauthorized display devices in a vehicle cabin according to one preferred and non-limiting embodiment or aspect. The method as shown is implemented or caused to be implemented by a processor, e.g., an on-board computer or other computing device, but also may be implemented or caused to be implemented by a remote computer in communication with the system 100. The processor is programmed or configured to communicate with at least one imaging device, at least one database, a remote back office system or monitoring station, and an in-vehicle display system for communicating information to and receiving information from the operator. First, the processor receives initial image data of the unoccupied cab from the imaging device at step 501. The unoccupied cab may contain authorized display devices, e.g., in-vehicle display screens, which are necessary for operating the vehicle. To account for the authorized display devices, the processor analyzes the initial image data to generate, control parameter data including the authorized display devices at step 502. The control parameter data may include, for example, regions of luminance and/or other types of information corresponding to portions of a bitmap. The parameter data may also include, for example, thermal intensity, contrast, object pixel count, object pixel geometry, color, or any other graphical parameters that may be used to compare with parameter data generated from other image data. Next, the processor stores the control parameter data in the database at step 503.

With continued reference to FIG. 5, when the vehicle is in operation, the processor periodically receives operational image data from the imaging device at step 504. The processor subsequently generates operational parameter data from the operational image data at step 505 and compares it to the control parameter data stored in the database at step 506. This comparison may include, for example, a comparison of detected regions of luminance or other graphical parameters. The processor determines if the parameter data matches at step 507, which may include determining if the parameter data is within a predefined tolerance or accepted variance parameter. Matching parameter data indicates that the regions of luminance are similar such that it can be determined that the only display devices in the cab are authorized devices. If it is determined that the parameter data that does not match, e.g., the luminance or other parameter is different or outside a predefined tolerance level, this suggests that unauthorized display devices are present in the cab.

With further reference to FIG. 5, if the parameter data matches, the processor continues to receive operational image data at step 504, generate operational parameter data from the operational image data at step 505, and compare the operational parameter data to the stored control parameter data at step 506. If the parameter data does not match, the processor proceeds to communicate the detection of an unauthorized display device to the remote back office system or monitoring station at step 508 and the operator of the vehicle at step 510. After communicating the detection event to the remote back office system or monitoring station at step 508, the processor may receive a communication from the station, e.g., a message for the operator, a command to slow or stop the vehicle, and/or a message to ignore the detection event at step 509. After communicating an in-cab alert at step 510, the processor may receive an input from the operator at step 511 confirming or denying the use of an unauthorized display device, or further confirming that the unauthorized device has been stowed away. Subsequent to steps 509 and 511, the processor records the detection event in the database at step 512 and proceeds with monitoring the cab at steps 504-507. Recorded detection event data may include time data, vehicle identification data, operator identification data, and/or any other event-identifying parameters. It will be appreciated that, as the processor continues to receive operational image data from the imaging device during operation of the vehicle, the generated operational parameter data may be compared to earlier generated operational parameter data to provide frame-by-frame comparisons, in addition to or as an alternative to the control parameter data comparison.

Figure 6:
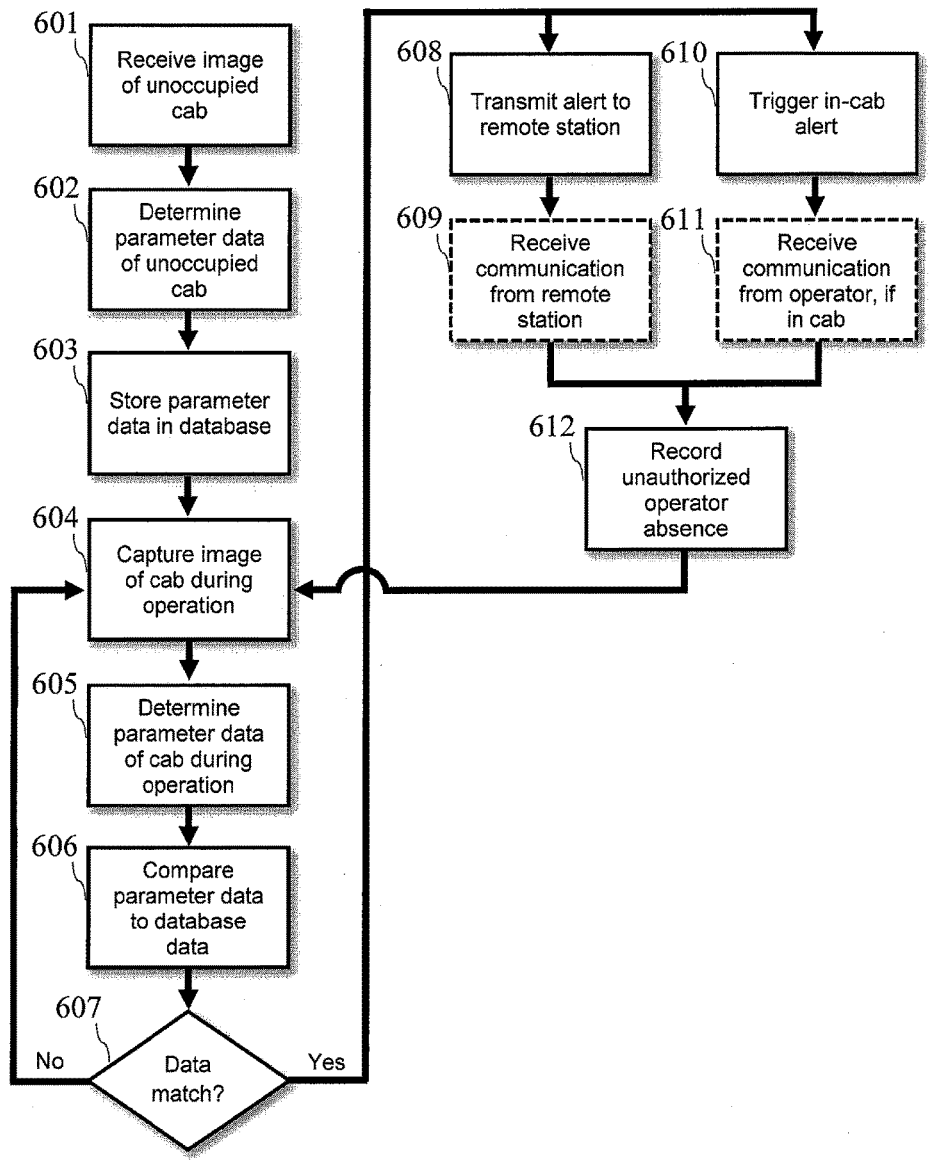
FIG. 6 is a step diagram of a method for detecting the absence of an operator in a vehicle cabin, according to the principles of the present invention.

With specific reference to FIG. 6, and in one preferred and non-limiting embodiment or aspect, provided is a step diagram of a method for detecting the absence of an operator from a vehicle cabin. The method as shown is implemented or caused to be implemented by a processor, e.g., an on-board computer or other computing device, but also may be implemented or caused to be implemented by a remote computer in communication with the system 100. The processor is programmed or configured to communicate with at least one imaging device, at least one database, a remote back office system or monitoring station, and an in-vehicle display system for communicating information to and receiving information from the operator. First, the processor receives initial image data of the unoccupied cabin from the imaging device at step 601. The processor then generates control parameter data from the initial image data at step 602. Parameter data may include thermal signals, luminance, contrast, object pixel count, object pixel geometry, color, or any other visual metric which may be compared from one image to another. Next, the processor stores the control parameter data in the database at step 603. When the vehicle is in operation, the processor periodically receives operational image data from the imaging device at step 604. The processor subsequently generates operational parameter data from the operational image data at step 605 and compares it to the control parameter data stored in the database at step 606. The processor determines if the parameter data matches at step 607, which may include determining if one or more parameters of the parameter data are within a set tolerance or accepted variance parameter. Matching parameter data indicates that the cabin is empty, which suggests that the operator is absent from the vehicle cabin. Parameter data that does not match may indicate that the cabin is visually different than when unoccupied, which suggests that the operator is present in the vehicle cabin.

With further reference to FIG. 6, if the parameter data does not match, the processor continues to receive operational image data at step 604, generate operational parameter data at step 605, and compare the operational parameter data to the stored control parameter data at step 606. If the operational parameter data substantially matches the control parameter data, the processor proceeds to communicate the detection of an absent operator to the remote back office system or monitoring station at step 608 and communicates an alert inside the vehicle cabin at step 610. After communicating the alert to the remote back office system or monitoring station at step 608, the processor may receive a communication from the station at step 609, such as a message for the operator, a command to slow or stop the vehicle, and/or a message to ignore the detection event. After communicating an in-cabin alert at step 610, the processor may receive input from the operator at step 611, confirming or denying absence from the cabin, or further explaining the absence from the cabin. Subsequent to steps 609 and 611, the processor records the detection event in the database at step 612 and proceeds with monitoring the cabin at steps 604-607. Recorded detection event data may include time data, vehicle identification data, operator identification data, and/or any other event-identifying parameters. It will be appreciated that, as the processor continues to receive operational image data from the imaging device during operation of the vehicle, the generated operational parameter data may be compared to earlier generated operational parameter data to provide frame-by-frame comparisons, in addition to or as an alternative to the control parameter data comparison. It will also be appreciated that the above method may be carried out for more than one operator or crew member, and alerts may be conditioned on the absence of one or more operators or crew members.

Figure 7:
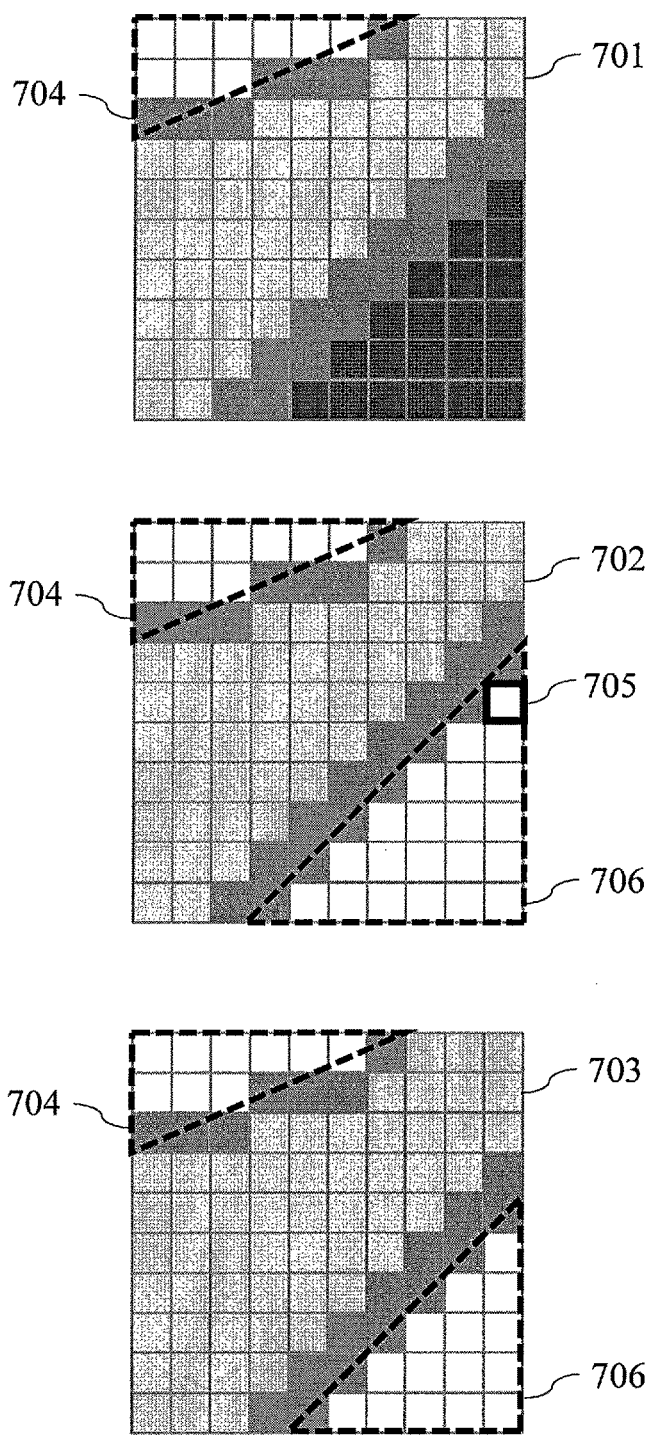
FIG. 7 is a schematic diagram of one embodiment or aspect of a process for detecting the use of unauthorized display devices in a vehicle cabin, according to the principles of the present invention.

With specific reference to FIG. 7, and in one preferred and non-limiting embodiment or aspect, provided is a schematic diagram of parameter data frames 701-703 captured from an imaging device, depicting a process for detecting the use of unauthorized display devices in a vehicle cabin. The frames are compared to each other, and the frame-by-frame comparisons may happen in real time, limited only by the computation rate of the computer or processor. One suggested frame rate sampling speed is 30 frames per second, but numerous other framerates and intervals are possible. It will be appreciated that frames may be compared in linear order of capture, or to any number of frames preceding or following the comparison frame. As shown in FIG. 7, each small square in the frames 701-703 represents a pixel, and pixels with lighter shades of grey represent pixels with higher luminance. The frames 701-703 as shown are 10 pixel-by-10 pixel subsections for simplicity of explanation, but in practice, the frames may be images of a much greater resolution, e.g., 1024 pixels by 768 pixels or greater. In the first frame 701, an authorized region of luminance 704 has been detected and noted in a database. The authorized region of luminance 704 can be determined from an imaging device's scan of the vehicle cabin while the cabin was unoccupied. The parameter data in the database representing the authorized region of luminance 704 may be updated over time as small differences in luminance occur due to changes in ambient light, caused by changes in sunlight, driving through tunnels, etc.

With further reference to FIG. 7, depicted is a second frame 702, later in time from the first frame 701, which encompasses a field of view where an unauthorized display device has been powered on and is emitting light. In processing the second frame 702, the processor has identified a brighter pixel 705 that is significantly greater in luminance when compared to the preceding frame 701. The processor then checks the pixels surrounding the brighter pixel 705 and groups those neighboring pixels that are significantly greater in luminance when compared to the preceding frame 701. This group defines a new region of luminance 706. Also depicted is a third frame 703, later in time from the first frame 701 and second frame 702, where the new region of luminance 706 has moved in position. Having determined the location of the group of brighter pixels, the processor can track the location of the new region of luminance 706. This is especially useful when determining whether the new region of luminance is a fleeting graphical artifact, or if it is an unauthorized display device. The processor can track the location, duration, and graphical quality of the new region of luminance 706, and having determined that the grouping is not accounted for in the control image, the processor will report the detection of an unauthorized display device. It will be appreciated that the above methods of identifying brighter pixels and regions of luminance can be applied to identifying dimmer or blacked-out pixels and regions of luminance caused by polarized display devices being monitored by a Polarized imaging device. It will also be appreciated that other methods of graphical analysis to determine regions of luminance may be employed, e.g., edge detection, gradient matching, and/or the like.

The methods shown in FIG. 7 can be further employed to determine the parameter data of one or more operators within the cabin. In addition to determining the location of the operators in their entirety, the bodies of the operators may be analyzed to determine the center of mass of each operator, so that certain regions of the image may be ignored, such as operator arms, hands, legs, feet, and/or the like. By approximating these body regions, especially as operators may sit in one location for long periods of time, more efficient computation and/or processing may be realized. If the center of mass of the operator begins to move, the processor may cease approximating the ignored body regions and once again analyze the entire image to fully account for operator location and movement. Furthermore, analysis of operator body structure, including determining the location of operator arms and hands, may aid the determination of unauthorized display device positioning within the cabin. For example, by determining operator arm and head positioning, if an unauthorized display device is tracked to a position between the hand and head of an operator, the processor may still report the device as present, even though the luminance of the device is hidden by the operator hand and head. In this manner, the processor will reduce reporting false positives of a device being stowed when the device is merely obscured by use, e.g., a cell phone being placed to the ear.

Although the invention has been described in detail for the purpose of illustration based on what is currently considered to be the most practical and preferred and non-limiting embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A monitoring system for detecting the presence of unauthorized display devices in a cabin of a vehicle, comprising:
    (a) at least one imaging device having a field of view including an interior of the cabin occupied by an operator of the vehicle during operation;
    (b) a data storage medium configured to store parameter data in a database, the parameter data comprising control parameter data for the interior of the cabin; and
    (c) at least one processor in communication with the at least one imaging device and the data storage medium, the at least one processor programmed or configured to:
        (i) receive operational image data from the at least one imaging device;
        (ii) generate operational parameter data from the operational image data;
        (iii) compare the operational parameter data to the control parameter data; and
        (iv) determine if at least one unauthorized display device is present in the cabin based at least partially on the comparison between the operational parameter data and the control parameter data.

2. The monitoring system of claim 1, wherein at least one of the following: the parameter data, the control parameter data, the operational parameter data, or any combination thereof comprises information or data representative of at least one of the following: thermal intensity, object luminance, background luminance, object location, object pixel count, object pixel geometry, object movement, or any combination thereof.

3. The monitoring system of claim 2, wherein the at least one imaging device is configured with a polarized filter, wherein the operational parameter data comprises data representative of lower object luminance relative to background luminance, the lower object luminance representative of the at least one unauthorized display device emitting polarized light with a device polarization approximately perpendicular in axis to an imaging polarization.

4. The monitoring system of claim 1, wherein the at least one processor is further programmed or configured to generate or edit the control parameter data stored in the database based on initial image data received from the at least one imaging device while the cabin is unoccupied, wherein the control parameter data comprises a representation of or information identifying at least one authorized display device.

5. The monitoring system of claim 1, wherein the at least one processor is further programmed or configured to periodically receive the operational image data from the at least one imaging device and generate the operational parameter data from the operational image data while the vehicle is in operation, and wherein the control parameter data is generated based on a portion of the operational parameter data corresponding to a prior time or time period, and wherein the comparison between the control parameter data and the operational parameter data comprises a comparison between the portion of the operational parameter data from the prior time or time period to a portion of the operational parameter data from a subsequent time or time period.

6. The monitoring system of claim 1, further comprising at least one alert device programmed or configured to communicate a notification or message to the operator in the cabin in response to determining that the at least one unauthorized display device is present in the cabin.

7. The monitoring system of claim 6, wherein the at least one alert device comprises at least one of the following: a display screen, a speaker, a vibration motor, an indicator light, or any combination thereof.

8. The monitoring system of claim 6, wherein the at least one alert device substantially continuously communicates the notification or message that the at least one unauthorized display device has been detected until the at least one processor determines that the at least one unauthorized display device is no longer detected.

9. The monitoring system of claim 6, wherein the at least one processor is further programmed or configured to receive a response from the operator confirming or denying that the at least one unauthorized display device has been present in the cabin.

10. The monitoring system of claim 1, further comprising at least one communication device located on or associated with the vehicle and configured to communicate, to a remote back office system or monitoring station, a notification or message that the at least one unauthorized display device was detected.

11. The monitoring system of claim 10, wherein the remote back office system or monitoring station comprises at least one processor programmed or configured to, in response to receiving the notification or message that the at least one unauthorized display device was detected, implement or cause to be implemented at least one of the following: cause the vehicle to alter an aspect or parameter of its operation, notify the operator in the cabin that the at least one unauthorized display device was detected, record detection event data corresponding to detecting the at least one unauthorized display device, or any combination thereof.

12. The monitoring system of claim 11, wherein the at least one processor of the remote back office system or monitoring station is further programmed or configured to:
cause the vehicle to stop responding to the operator's control;
communicate to the operator that the at least one unauthorized display device was detected; and
return control to the operator in response to the remote back office system or monitoring station receiving a notification or message that the at least one unauthorized display device is no longer detected.

13. The monitoring system of claim 1, further comprising an event database, associated with the vehicle or a remote back office system or monitoring station, configured to store data representative of unauthorized display device detection events, the data comprising at least one of the following: time data, vehicle identification data, operator identification data, or any combination thereof.

14. The monitoring system of claim 13, wherein the data further comprises at least a portion of the operational image data received from the at least one imaging device from a time period during which the at least one unauthorized display device was detected.

15. The monitoring system of claim 1, wherein the vehicle is a train and the at least one processor comprises an on-board computer positioned on the train.

16. A method for detecting the presence of unauthorized display devices in a cabin of a vehicle, wherein the cabin comprises at least one imaging device having a field of view including at least a portion of an interior of the cabin, the method comprising:
receiving operational image data from the at least one imaging device while the vehicle is being operated by an operator;
generating, with at least one processor, operational parameter data from the operational image data based on at least one of the following: thermal intensity, a region of luminance, an object luminance, a background luminance, or any combination thereof;
comparing, with at least one processor, the operational parameter data to control parameter data for the cabin stored in at least one data storage device;
determining, with at least one processor, if at least one unauthorized display device is present in the cabin based on the comparison between the operational parameter data and the control parameter data; and
in response to determining that at least one unauthorized display device is present in the cabin, generating an alert with at least one processor.

17. The method of claim 16, wherein the at least one imaging device is configured with a polarized filter, wherein the operational parameter data comprises data representative of lower object luminance relative to background luminance, the lower object luminance representative of the at least one unauthorized display device emitting polarized light with a device polarization approximately perpendicular in axis to an imaging polarization.

18. The method of claim 16, wherein the control parameter data comprises parameter data that is predefined or generated from previous image data.

19. The method of claim 18, wherein the control parameter data is generated from the previous image data, the method further comprising:
receiving the previous image data from the at least one imaging device while the vehicle is not in operation and the cabin is unoccupied; and generating the control parameter data based on the previous image data and at least one authorized display device present in the unoccupied cabin,
wherein determining if the at least one unauthorized display device is present in the cabin comprises determining whether the operational parameter data comprises a region of luminance that does not correspond to the at least one authorized display device.

20. The method of claim 16, further comprising periodically receiving the operational image data from the at least one imaging device, wherein the operational parameter data is generated from the operational image data while the vehicle is in operation, wherein the control parameter data is generated based on a portion of the operational parameter data corresponding to a prior time or time period, and wherein the comparison between the control parameter data and the operational parameter data comprises a comparison between the portion of the operational parameter data from the prior time or time period to a portion of the operational parameter data from a subsequent time or time period.

21. The method of claim 16, further comprising causing at least one alert device to communicate a notification or message to the operator in the cabin that the at least one unauthorized display device has been detected, wherein the at least one alert device comprises at least one of the following: a display screen, a speaker, a vibration motor, an indicator light, or any combination thereof.

22. The method of claim 21, wherein the at least one alert device substantially continuously communicates the notification or message that the at least one unauthorized display device has been detected until the at least one processor determines that the at least one unauthorized display device is no longer detected.

23. The method of claim 21, further comprising receiving a response from the operator confirming or denying that the at least one unauthorized display device has been present in the cabin.

24. The method of claim 16, further comprising communicating a notification or message to a remote back office system or monitoring station that the at least one unauthorized display device has been detected.

25. The method of claim 24, further comprising, in response to receiving a communication from the remote back office system or monitoring station, implementing or causing the implementation of at least one of the following: causing the vehicle to alter an aspect or parameter of its operation, notifying the operator that the at least one unauthorized display device was detected in the cabin, recording detection event data corresponding to detecting the at least one unauthorized display device, or any combination thereof.

26. The method of claim 16, further comprising storing, in a database, unauthorized display device detection events comprising at least one of the following: time data, vehicle identification data, operator identification data, or a combination thereof.

27. The method of claim 26, wherein the unauthorized display device detection events stored in the database further comprise at least a portion of the operational image data received from the at least one imaging device from a time period during which the at least one unauthorized display device was detected.

28. An apparatus for detecting the presence of unauthorized display devices in a cabin of a vehicle, wherein the cabin comprises at least one imaging device having a field of view including at least a portion of an interior of the cabin, the apparatus comprising at least one non-transitory computer-readable medium having program instructions stored thereon that, when executed by at least one processor, cause the at least one processor to:
receive operational image data from the at least one imaging device while the vehicle is being operated;
generate operational parameter data from the operational image data based on at least one of the following: thermal intensity, a region of luminance, an object luminance, a background luminance, or any combination thereof;
compare the operational parameter data to control parameter data for the cabin stored in at least one data storage device;
determine if at least one unauthorized display device is present in the cabin based on the comparison between the operational parameter data and the control parameter data; and
generate an alert in response to determining that at least one unauthorized display device is present in the cabin.

29. A monitoring system for detecting a condition in a locomotive cab of a train, comprising:
(a) at least one imaging device having a field of view including at least a portion of an interior of the locomotive cab occupied by an operator of the train during operation;
(b) a data storage medium configured to store parameter data in a database, the parameter data comprising control parameter data for the interior of the locomotive cab; and
(c) at least one processor in communication with the at least one imaging device and the data storage medium, the at least one processor programmed or configured to:
(i) receive operational image data from the at least one imaging device;
(ii) generate operational parameter data from the operational image data;
(iii) compare the operational parameter data to the control parameter data; and
(iv) determine, based at least partially on the comparison between the operational parameter data and the control parameter data, at least one of the following: if at least one operator of the train is absent from the interior of the locomotive cab, if at least one unauthorized display device is present in the locomotive cab, or any combination thereof.

30. The system of claim 29, wherein the at least one imaging device is configured with a polarized filter, wherein the operational parameter data comprises data representative of lower object luminance compared to background luminance, the lower object luminance representative of the at least one unauthorized display device emitting polarized light with a device polarization approximately perpendicular in axis to an imaging polarization.

31. The system of claim 29, wherein the at least one processor is further programmed or configured to generate the control parameter data based on initial image data received from the at least one imaging device while the interior of the locomotive cab is unoccupied.

32. The monitoring system of claim 29, wherein the at least one processor is further programmed or configured to periodically receive the operational image data from the at least one imaging device, generate operational parameter data from the operational image data while the train is in operation, and edit the database to update the control parameter data of the interior of the locomotive cab, wherein the control parameter data is generated based on a portion of the operational parameter data corresponding to a prior time or time period, and wherein the comparison between the control parameter data and the operational parameter data comprises a comparison between the portion of the operational parameter data from the prior time or time period to a portion of the operational parameter data from a subsequent time or time period.

33. The monitoring system of claim 29, further comprising at least one alert device programmed or configured to communicate a notification or message within the locomotive cab in response to determining that the at least one unauthorized display device is present in the locomotive cab or that the at least one operator of the train is absent from the interior of the locomotive cab.

34. The monitoring system of claim 33, wherein the at least one alert device comprises at least one of the following: a display screen, a speaker, a vibration motor, an indicator light, or any combination thereof.

35. The monitoring system of claim 33, wherein the at least one alert device substantially continuously communicates the notification or message within the locomotive cab that the at least one unauthorized display device has been detected or that the at least one operator of the train is absent from the interior of the locomotive cab until the at least one processor determines that the at least one unauthorized display device is no longer detected or that the at least one operator of the train is present in the interior of the locomotive cab.

36. The monitoring system of claim 29, further comprising at least one communication device located on or associated with the train and configured to communicate, to a remote back office system or monitoring station, a notification or message that the at least one unauthorized display device was detected or that the at least one operator of the train is absent from the interior of the locomotive cab.

37. The monitoring system of claim 36, wherein the remote back office system or monitoring station comprises at least one processor programmed or configured to, in response to receiving the notification or message that the at least one unauthorized display device was detected or that the at least one operator of the train is absent from the interior of the locomotive cab, implement or cause to be implemented at least one of the following: cause the train to alter an aspect or parameter of its operation, notify the operator in the locomotive cab that the at least one unauthorized display device was detected, communicate a notification or message within the locomotive cab that the at least one operator of the train is absent from the interior of the locomotive cab, record event data corresponding to detecting the at least one unauthorized display device, or any combination thereof.

38. The monitoring system of claim 36, wherein the at least one processor of the remote back office system or monitoring station is further programmed or configured to:
 cause the train to stop responding to the operator's control; and
 return control to the operator in response to the remote back office system or monitoring station receiving the notification or message that the at least one unauthorized display device is no longer detected or that the at least one operator is present.

39. The monitoring system of claim 29, further comprising a database, associated with the train or a remote back office system or monitoring station, configured to store data representative of unauthorized display device detection events or unoccupied locomotive cab detection events, the data comprising at least one of the following: time data, train identification data, operator identification data, or any combination thereof.

40. The monitoring system of claim 39, wherein the data further comprises at least a portion of the operational image data received from the at least one imaging device from a time period during which the at least one unauthorized display device or the absence of the at least one operator was detected.

41. The monitoring system of claim 29, wherein the at least one processor comprises an on-board computer positioned on the train.

\* \* \* \* \*